United States Patent
Benyo et al.

(10) Patent No.: US 9,031,747 B2
(45) Date of Patent: May 12, 2015

(54) CONTROL IN AN ELECTRIC STEERING SYSTEM

(75) Inventors: Imre Benyo, Budapest (HU); Sandor Szucs, Parasznya (HU); Imre Szepessy, Budapest (HU); Dora Szabolcs, Gyongyos (HU)

(73) Assignee: ThyssenKrupp Presta AG, Eschen (LI)

( * ) Notice: Subject to any disclaimer, the term of this patent is extended or adjusted under 35 U.S.C. 154(b) by 127 days.

(21) Appl. No.: 13/825,658

(22) PCT Filed: Jul. 21, 2011

(86) PCT No.: PCT/EP2011/003661
§ 371 (c)(1),
(2), (4) Date: Apr. 11, 2013

(87) PCT Pub. No.: WO2012/037995
PCT Pub. Date: Mar. 29, 2012

(65) Prior Publication Data
US 2013/0211676 A1    Aug. 15, 2013

(30) Foreign Application Priority Data
Sep. 23, 2010 (WO) .................. PCT/EP2010/005817

(51) Int. Cl.
*B62D 5/04* (2006.01)
*B62D 15/02* (2006.01)

(52) U.S. Cl.
CPC ............ *B62D 5/0463* (2013.01); *B62D 15/025* (2013.01)

(58) Field of Classification Search
CPC ........................... B62D 15/025; B62D 5/0463
USPC .......................................................... 701/42
See application file for complete search history.

(56) References Cited

U.S. PATENT DOCUMENTS

| | | | |
|---|---|---|---|
| 8,175,771 B2* | 5/2012 | Ukai et al. ....................... 701/41 |
| 8,285,451 B2* | 10/2012 | Ta et al. .......................... 701/41 |
| 8,977,437 B2* | 3/2015 | Tamaizumi et al. ............. 701/42 |
| 2002/0019690 A1* | 2/2002 | Kurishige et al. ............... 701/41 |
| 2002/0053481 A1* | 5/2002 | Itakura et al. .................. 180/446 |
| 2003/0144780 A1* | 7/2003 | Recker et al. .................... 701/41 |

(Continued)

FOREIGN PATENT DOCUMENTS

| | | |
|---|---|---|
| DE | 4332836 C1 | 9/1994 |
| DE | 102008057313 A1 | 10/2009 |

(Continued)

OTHER PUBLICATIONS

International Search Report and Written Opinion issued in PCT/EP2011/003661, mailed Nov. 30, 2011.

(Continued)

*Primary Examiner* — Mary Cheung
*Assistant Examiner* — Atul Trivedi
(74) *Attorney, Agent, or Firm* — Panitch Schwarze Belisario & Nadel LLP (57) ABSTRACT

An electric power steering system may be controlled by superimposing a driver demand and a driver assistance device demand value to calculate a driver requested support value, in which a virtual driver support value may be calculated based on driver demand and a correction driver support value may be calculated based on a driver assistance device demand value, and the driver requested support value may be calculated as a combination of the virtual correction driver support value and the virtual driver support value.

10 Claims, 4 Drawing Sheets

(56) References Cited

U.S. PATENT DOCUMENTS

| | | | |
|---|---|---|---|
| 2004/0226770 A1* | 11/2004 | Nishiyama et al. | 180/446 |
| 2005/0061577 A1* | 3/2005 | Shimizu et al. | 180/446 |
| 2005/0072621 A1* | 4/2005 | Hara et al. | 180/444 |
| 2006/0086560 A1* | 4/2006 | Furusho et al. | 180/446 |
| 2007/0168093 A1* | 7/2007 | Nishiyama | 701/41 |
| 2008/0306655 A1* | 12/2008 | Ukai et al. | 701/42 |
| 2009/0071745 A1* | 3/2009 | Itakura et al. | 180/446 |
| 2009/0078494 A1* | 3/2009 | Dornhege et al. | 180/446 |
| 2009/0082925 A1* | 3/2009 | Wijffels et al. | 701/42 |
| 2010/0004824 A1* | 1/2010 | Ikeda et al. | 701/42 |
| 2010/0168998 A1* | 7/2010 | Matsunaga | 701/200 |
| 2014/0303848 A1* | 10/2014 | Bean et al. | 701/41 |

FOREIGN PATENT DOCUMENTS

| | | |
|---|---|---|
| EP | 1800994 A1 | 6/2007 |
| EP | 1935757 A1 | 6/2008 |

OTHER PUBLICATIONS

Search Report issued in PCT/EP2010/005817 mailed Jun. 9, 2011.
International Preliminary Report on Patentability issued in PCT/EP2011/003661, issued Mar. 26, 2013.

* cited by examiner

CONTROL IN AN ELECTRIC STEERING SYSTEM

CROSS-REFERENCE TO RELATED APPLICATIONS

This Application is a National Stage of PCT International Application No. PCT/EP2011/003661, filed on Jul. 21, 2011, and claims priority to PCT International Application No. PCT/EP2010/005817, filed on Sep. 23, 2010. The disclosures of the aforementioned applications are incorporated herein in their entirety by reference.

BACKGROUND OF THE INVENTION

The present invention relates to a method for operating an electric power steering apparatus with the features of the preamble of claim 1.

The present invention relates further to a control device with the features of the preamble of claim 7.

Driver assistance systems are generally developed for the purpose of improving safety and driving comfort. Such an assistance system could be a parking assistance system or a lane keeping assistance system or another system which has influences on the steering behaviour of the vehicle. Such assistance systems are more and more used in relation with the use of electric power assistant steering systems. A general problem using such automatically steering devices consists in a failure of such system and a mislead steering operation as result from it. Therefore it is necessary the driver has the main control power. As result a limiting of the output from such driver assistance systems is necessary.

DESCRIPTION OF THE RELATED ART

The DE102008057313A1 describes a steering system in which the lane keep assistant outputs an additional control steering torque. The correction steering torque of the lane keep assistant is build as to the difference from driver steering torque minus the control steering torque. The control steering torque and/or the driver steering torque are limited by a maximum value. Further the derivation of the control steering torque and/or the derivation of the driver steering torque could be limited by a maximum value. A similar device is described in the DE4332836C1. This disclosure describes also a limiting of the additional demand value. According to DE4332836C1 the limit will be a fixed limit.

The DE102008002401A1 discloses a driver assistance system in which the derivation of the lane parameters are detected and compared with threshold limit values. If the derivation of the lane parameters exceeds the threshold limit, the lane keep assistant is switched off. A problem of such solutions consists in the sudden change of the situation which includes the danger of disturbances for the driver. Further it is not easy to find reasonable threshold values for the derivation of the lane parameters.

Such driver assistance devices with fix threshold limit values could disturb the driver in an event in which the limit is suddenly reached and the device is either switched off or the additional steering torque is not increased as the driver expects.

It is therefore an object of the present invention to provide a steering apparatus with a driver assistance input in which the additional steering torque is smoothly limited and disturbances for the driver are reduced.

SUMMARY OF INVENTION

This object is achieved by a method with the features of claim 1. Further this object is achieved by a device with the features of claim 7. The depending claims describe improvements of the invention.

Because the correction driver support value is calculated by following steps:
  calculating an intermediate correction driver support value on basis of the driver assistance device demand value;
  comparing the absolute value of the intermediate correction driver support value with a assistance limit;
  if the absolute value of the intermediate correction driver support value exceeds the assistance limit then multiplying the intermediate correction driver support value with a limiting factor to get the correction driver support value, wherein the limiting factor has a value, which is less than one and higher or equal than zero,
  if the absolute value of the intermediate correction driver support value is less than the assistance limit, then set the correction driver support value as to the intermediate correction driver support value,
the correction of the driver support by the driver assistance is limited smoothly and not abruptly. The driver has the power to overturn proposes of the assistance system and disturbances are minimized.

In a preferred embodiment of the invention the assistance limit (TR0max) is depending on a basic value—the actual vehicle speed (v). More preferred is the assistance limit (TR0max) higher in case of low vehicle speeds than at higher vehicle speeds.

In a preferred embodiment of the invention the limiting factor k is depending on a further basic value—the actual steering angle α to improve the response to the driving situation.

In an alternative preferred embodiment of the invention the limiting factor k is depending on a further basic value—the actual steering torque (TA), to improve also the response to the driving situation.

In a very preferred way the actual steering torque, and the steering angle are used to calculate the limiting factor k and the vehicle speed is used to calculate the assistance limit. As result the limit of the correction driver support value is adopt to driving situations such as parking, city drive or high way drive situations. As example a high steering torque at low vehicle speed with a high steering angle hints to have a parking situation. In such situation, a lane keeping system should perhaps not be so much relevant or could even be critical.

The relation between the basic values should be determined before the vehicle is put into operation. Normally such relation is determined during the design of the steering system. It is possible to find functional relationships between the basic values and the assistance limit or the respective limiting factor k. As preferred the functional relationship for each basic value is calculated in a separate function, perhaps in a separate function block. A first function is set for the relation between the limit value TR0max and the vehicle speed v. A second function is set for the relation between a first limiting factor k1 and the steering torque TA. A third function is set for the relation between a second limiting factor k2 and the steering angle α. If the absolute value of the intermediate correction driver support value exceeds the assistance limit (TR0max) resulting from the first function as result from the actual vehicle speed the limiting procedure is started. The first limiting factor k1 is calculated in the second function as result from the steering torque TA. Then the second limiting factor k2 is calculated in the third function as result from the steering angle α. Then the limiting factor k is calculated as result of multiplying k1*k2. To get the limited assistance support, the intermediate correction driver support value is multiplied with the limiting factor k to get the correction driver support value.

As alternative the relationship for each basic value is stored in a separate look-up table. A first look-up table is provided for the relation between the limit value TR0max and the vehicle speed v. A second look-up table is provided for the relation between a first limiting factor k1 and the steering torque TA. A third look-up table is provided for the relation between a second limiting factor k2 and the steering angle α. If the absolute value of the intermediate correction driver support value exceeds the assistance limit (TR0max) at reading from the first look-up table as result from the actual vehicle speed, the limiting procedure is started. The first limiting factor k1 is read from the second look-up table as result from the steering torque TA. Then the second limiting factor k2 is read from the third look-up table as result from the steering angle α. Then the limiting factor k is calculating as result of multiplying k1*k2. To get the limited assistance support the intermediate correction driver support value is multiplied with the limiting factor k to get the correction driver support value.

It is possible to combine any calculation of the said first, second or third functions with any reading of the said first, second or third look-up tables. As result the relation between the limiting factor k and the one or more basic values (v, α, TA) are predetermined and calculated in one of said functional blocks or stored in one of said look-up tables.

As an embodiment of the invention the steering shaft torque which is introduced into the steering shaft by the driver is used as driver demand. Additionally or alternatively the virtual requested motor torque is used as the virtual driver requested support value. Additionally or alternatively the correction driver support torque is used as the correction driver support value.

The object of the invention is achieved with a control device for an electric power steering system, applicable for controlling a requested motor torque supporting the driver effort during a steering operation by superimposing a driver demand and a driver assistance device demand value, wherein the device comprises:
- a first controller portion, which calculates a virtual driver support value;
- a first assistance controller portion with an electric input for the driver assistance device demand value, which calculates an intermediate correction driver support value;
- a limiting controller portion with an input for the intermediate correction driver support value outputs from the first assistance controller portion, and with an input for basic values, at least vehicle speed (v) and/or steering angle (α) and/or steering torque (TA), which limits the intermediate correction driver support value by multiplying with the limiting factor (k) and outputs the limited value as the correction driver support value;
- an adder, to calculate the requested motor torque as sum of the correction driver support value and the virtual driver support value, and to output them to further devices of the electric power steering system, for example a motor control device.

Such device is well adopted to limit the driver support by an assistance device smoothly.

As an improvement, the control device further comprises an observer in which on basis of at least the vehicle speed (v) and the steering shaft torque and a mathematically model for the steering device, relevant values are calculated improving the steering control result.

DESCRIPTION OF THE DRAWINGS

A preferred embodiment is described in view of the attached drawings, in which.

Similar or similar by acting devices or signals are marked with the same references.

Figure 1:
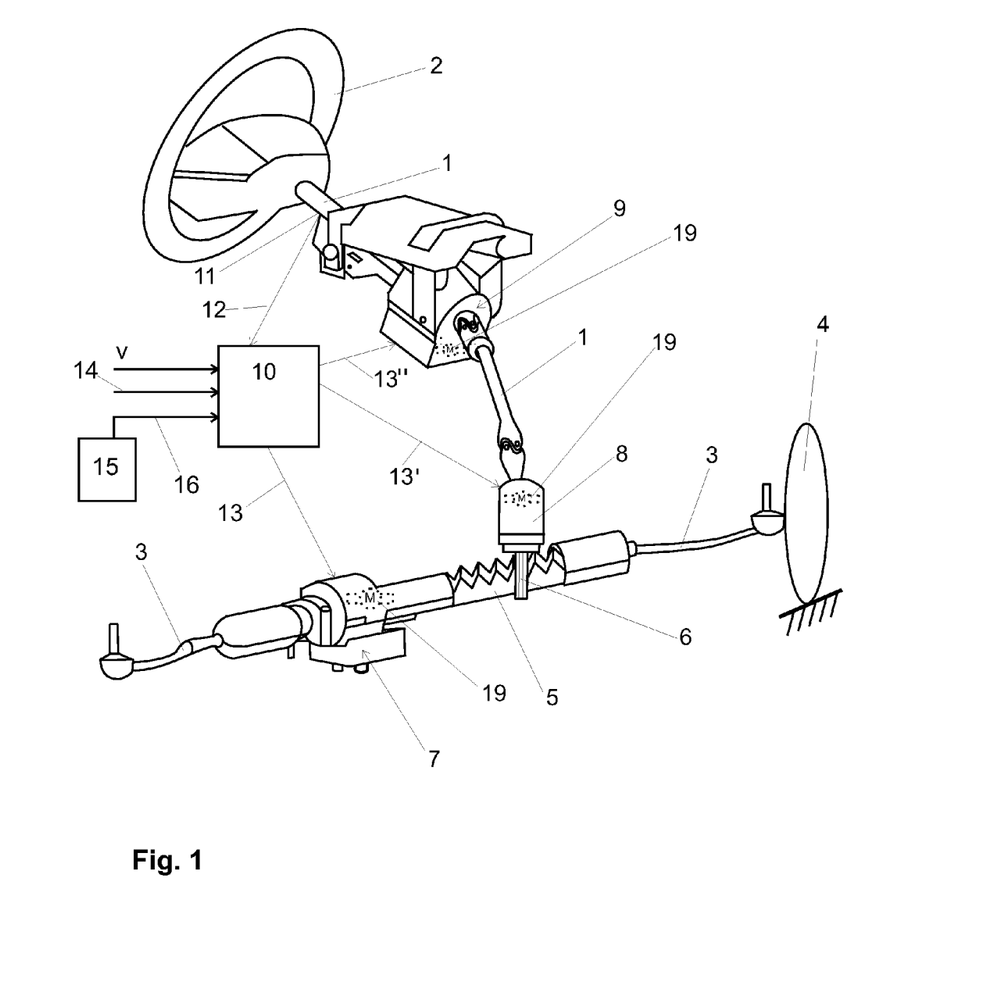
FIG. 1: shows a steering device with steering power support means according to the present invention.

In the following examples the driver demand 12 is realized with the steering shaft torque 12 and the driver support is realized with the motor torque output by the motor 19 into the steering device to adjust the rack 5. In the following the intermediate values are also realized with torque values. The virtual driver support value 23 is realized with the virtual requested motor torque 23. The correction driver support value 26 is representing the correction virtual requested motor torque 26. It is in principle also possible to support the driver with an angle support. In such case a motor angle would represent the driver support, and a correction driver support angle would represent the correction driver support value 26, and so on.

DETAILED DESCRIPTION OF THE DRAWINGS

FIG. 1 shows a steering device to which a first embodiment of the invention can be applied. The steering device comprises a steering shaft 1 and a steering hand wheel 2 which is adopted to a first end of the steering shaft 1. A road wheel 4 is adjustable by a tie rod 3. The tie rod 3 is driven by a rack 5. A pinion 6 meshes with the rack 5. By rotating the pinion 6, said rack 5 is driven in longitudinal direction. The pinion 6 is driven by rotating the hand wheel 2 wherein the rotating torque is transmitted by the steering shaft 1. The steering device further comprises a power support means to introduce a support torque into the steering actuator. A power support means 7 could in a first embodiment be arranged to act in longitudinal direction of the rack 5. Such power support means are well known and can use an electric motor 19, which is coupled over a belt drive to a ball screw mechanism to drive the rack 5 in longitudinal direction.

According to a second embodiment applicable to the invention, the power support means 8 is arranged to drive the pinion 6. In this case the power support means could consist of an electric motor 19, which is coupled to the pinion 6 by a reduction gear.

In another embodiment applicable to the invention, the power support means 9 is arranged near the steering column to introduce the support, in this case a support torque, into the steering shaft 1. Also in this case the power support means could consist of an electric motor 19, which is coupled to steering shaft by a reduction gear.

A main control device 10 get signals 12 from a torque sensor 11 and the signal for the vehicle speed v and a signal representing a steering angle 14. Driver assistance device 15 outputs a driver assistance demand value 16 to the control device 10. The control device 10 calculates requested supply power value 13, 13', or 13" outputting them to the respective electric motor of the power support means 7 or power support means 8 or power support means 9 depending on the particular embodiment of the steering device. In the most preferred embodiment of the invention the requested supply power value is equal to the requested motor torque 13, 13' or 13". When the driver adjusts the steering wheel 2, he or she introduces a steering shaft torque into the steering device, which is measured by the steering torque sensor 11. Depending on the value of the steering torque signal 11, and other parameters of the vehicle par example the vehicle speed v, perhaps of other parameters 14 of the steering situation, and of the driver assistance demand value 15 the control device 10 calculates a power support moment to reduce the hand wheel torque for the driver.

All of these different embodiments are applicable to the invention because the arrangement of the power support means can be controlled by different embodiments of control devices and with different control methods.

Figure 2:
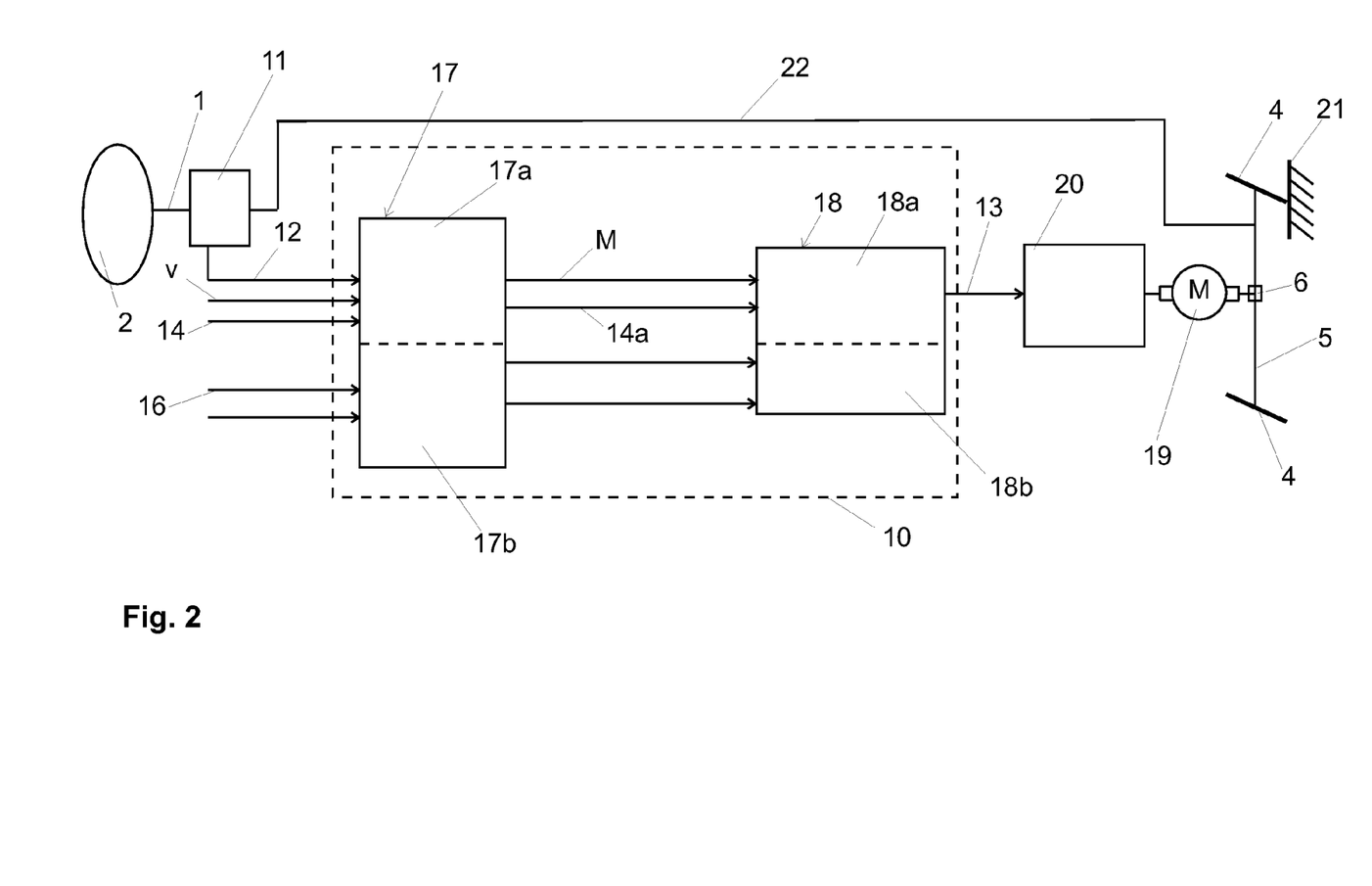
FIG. 2: shows a block diagram of the assistance input in the steering system of FIG. 1.

FIG. 2 shows a block diagram of an electric power steering system for a road vehicle.

FIG. 2 shows a first embodiment of the control device and control method for a steering device with steering power support means and a driver assistance device 15 (not shown). The steering shaft torque value 12, which is introduced by the steering hand wheel 2 and measured by the torque sensor 11, is output to an observer device 17, which calculates state parameters for the steering system and/or vehicle system on the basis of a steering device model and/or vehicle model. Further the assistance demand 16 is introduced into the observer device 17. If there are further measured values 14 available like vehicle speed v and/or vehicle acceleration and/or steering angle and/or steering angle speed and/or acceleration and/or other steering and/or vehicle values, they will also be fed into the observer device 17 of the main control device 10. In the observer device 17, many necessary or useful state parameters of the vehicle and the steering system are calculated to improve the controlling of the steering power support means. On the basis of the steering shaft torque 12 the observer 17 calculates steering wheel torque M and other vehicle and/or steering parameters 14a. On the basis of the assistance demand 16 the observer 17 calculates the assistance demand value. The steering wheel torque M, the assistance demand value 24 and other vehicle parameters 14a, which are a result of calculation in observer device 17 or are transferred from sensors are input into the control device 18. The control device 18 calculates a requested power supply 13, especially a requested motor torque 13, and outputs it to the motor control device 20. The control device 18 is divided in a basic controller portion 18a and an assistance controller portion 18b. The observer 17 is separated in a first portion 17a, which outputs parameters for the basic controller portion 18a and a second portion 17b which outputs parameters for the assistance controller portion 18b.

The motor control device 20 outputs the motor current value to the coils of the motor 19. Usually such a motor control device 20 works with a pulse width modulation (PWM), which is well known in the prior art. Other methods to control the electric motor 19 are also possible and applicable. The motor outputs the torque to adjust the rack 5 in a longitudinal direction to turn the road wheels 4. By the road surface 21 a back load in longitudinal direction is introduced into the rack 5. Through a mechanical coupling 22, feedback information is transferred back into the steering shaft 1, thereby closing the feedback control circuit. In the simplest way the mechanical coupling 22 is realized by the steering shaft 1.

Figure 3:
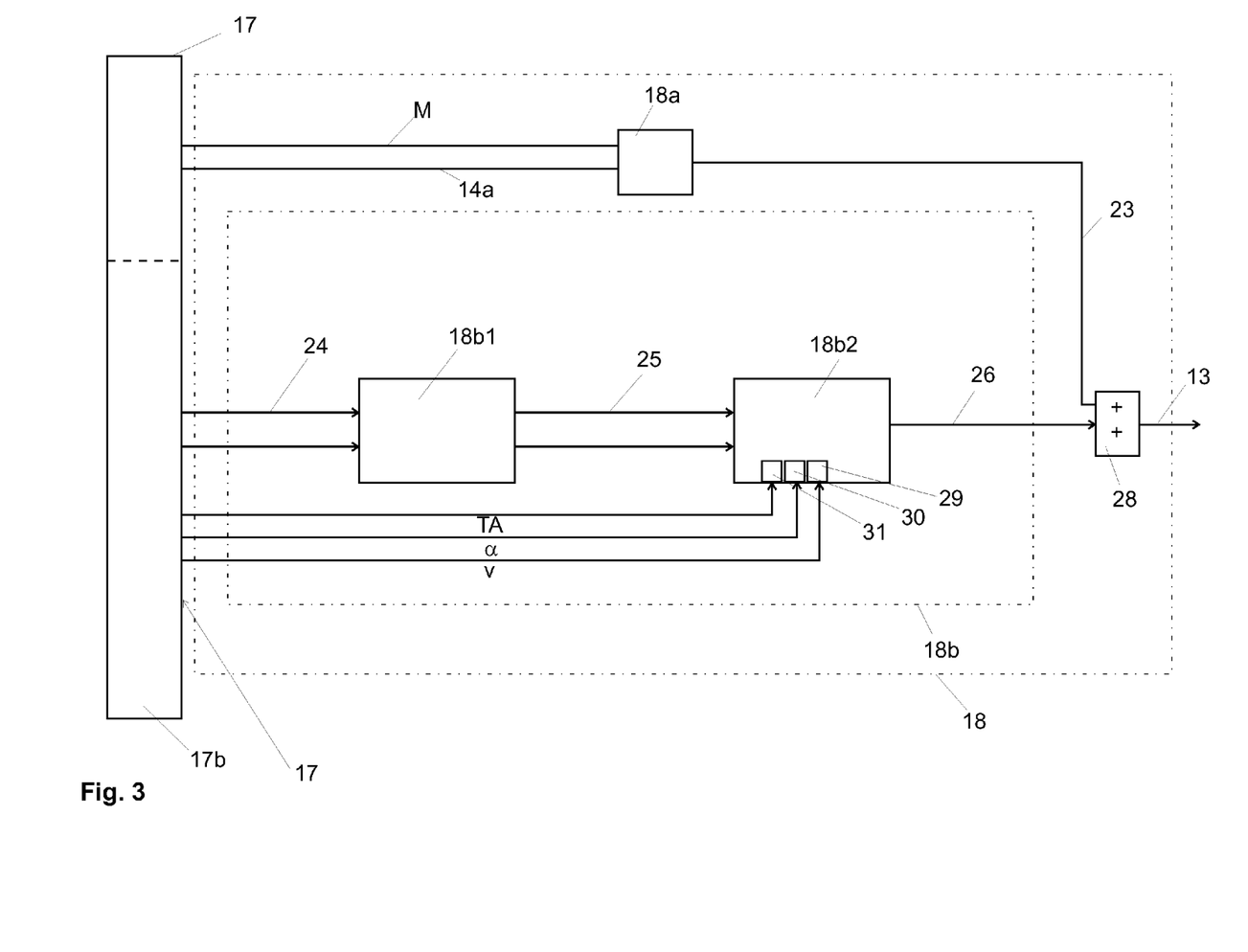
FIG. 3: shows a more detailed block diagram in the steering system of FIG. 2.

FIG. 3 shows a principle block diagram of the limiting process for the driver assistance demand value 24, which is represented by an assistance demand torque 24 and is implemented in the control device 18. The controller device 18 comprises a basic controller portion 18a to calculate a virtual requested motor torque 23 on basis of the steering shaft torque 12 or as an alternative of the steering wheel torque M and other parameters 14a, which could include one or more of the state parameters and the vehicle speed v and/or other measured signals 14. Such calculation procedures are well known in the state of the art.

The control device 18 further comprises the assistance controller portion 18b to calculate the correction driver support torque 26 as result of the assistance demand 16 or as an alternative of the assistance demand torque 24.

As an alternative or in combination with the in Figures shown embodiments the driver assistance demand value 24 could be an assistant rack force demand or an assistance rack position demand or an assistance steering angle demand or an assistance derivation steering angle demand.

In a first step an intermediate correction driver support value 25 in the first assistance controller portion 18b1 is calculated. Sometimes it could happen that this value 25 is too high or is not well adapted to the driving situation. The intermediate correction driver support value 25 could fail because the of assistance device 15 or sensors (not shown) failures. Such failures could especially also be a result of an error in the software or hardware, as example the random processor. To avoid problems for the driver, the intermediate correction driver support value 25 is limiting in the limiting assistance controller portion 18b2.

The limiting assistance controller portion 18b2 includes the functional relationships in the first function block 29 for the first function and the second functional block 30 for the second function and the third functional block 31 for the third function (See FIG. 3). On basis of the vehicle speed v the assistance limit TR0max is calculated in the first functional block 29. On basis the steering torque TA the first limiting factor k1 is calculated in the second functional block 30. The steering torque TA could be the torque against the turning of the road wheel 4. This torque could be represented by the rack load or the steering shaft torque 12. In the simplest way without using an observer device 17 the measured steering shaft torque 12 would be used as steering torque TA. On the basis of the steering angle α the second limiting factor k2 is calculated in the third functional block 31.

As alternative the limiting assistance controller portion 18b2 includes the memory for the first look-up table 29 and the second look-up table 30 and the third look-up table 31. On basis of the vehicle speed v the assistance limit TR0max is read from the first look-up table 29 (FIG. 3 should also be readable as to this alternative). A memory block 32 is provided for storage of the assistance limit TR0max. This memory block 32 makes the calculated assistance limit TR0max readily available to subsequent processes.

On the basis of the steering torque TA, the first limiting factor k1 is read from the second look-up table 30. The steering torque TA could be the torque against the turning of the road wheel 4. This torque could be represented by the rack load or the steering shaft torque 12. In the simplest way without using an observer device 17 the measured steering shaft torque 12 would be used as steering torque TA. On basis the steering angle α the second limiting factor k2 is reading from the third look-up table 31.

As Example in FIG. 3 is shown a combination device 33 which combines by multiplication the first limiting factor k1 as output of said second functional block 30 and the second limiting factor k2 as output of said third functional block 31 to a limiting factor k and which calculates said correction driver support value 26 on the basis of said assistance limit TR0max, said limiting factor k, and said intermediate correction driver support value 25.

It is possible to use one or more additional other limiting factors, which are calculated on the basis of other signals, nevertheless this is not shown in the drawings. If there are one or more additional other limiting factors ki used, these factors could be also inputted into the combination device 33 to calculate the limiting factor k by multiplying all these limiting factors: k=k1×k2×ki . . . (not shown in the drawings).

The steering angle α could be any relevant angle in the steering device. It could be also the yaw rate or the swimming angle. In the simplest way without using an observer the rotational angle of the steering shaft is used.

In the example of FIG. 3 the input values of the control device 18 are output from the observer 17. As alternative it is also possible to omit the observer 17 and use measured values, like the steering shaft torque 12, the vehicle speed v, the assistance demand 16, and other values 14 directly. The quality of the control result would be reduced but the main control device 10 design would be simpler and cheaper.

Figure 4:
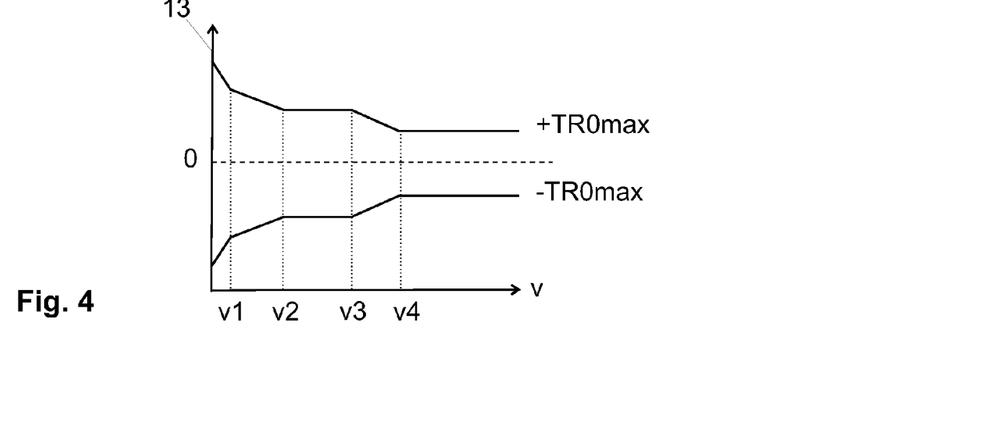
FIG. 4: shows an example for the intermediate requested motor torque limit TR0max in relation to the vehicle speed v.
Figure 5:
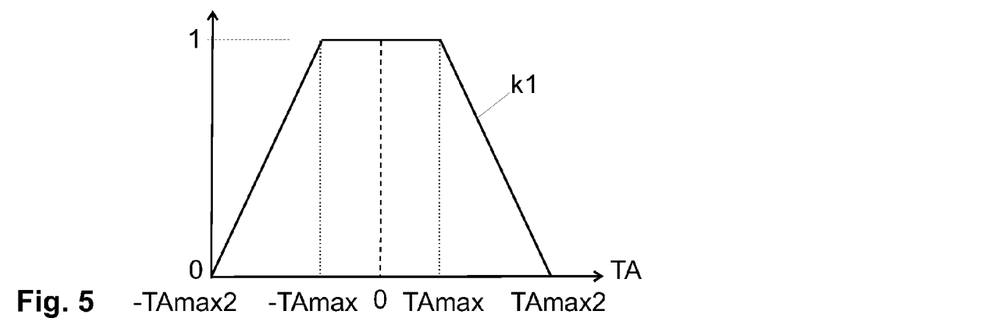
FIG. 5: shows an example for the relation of a scale factor k1 in relation to the steering wheel torque.
Figure 6:
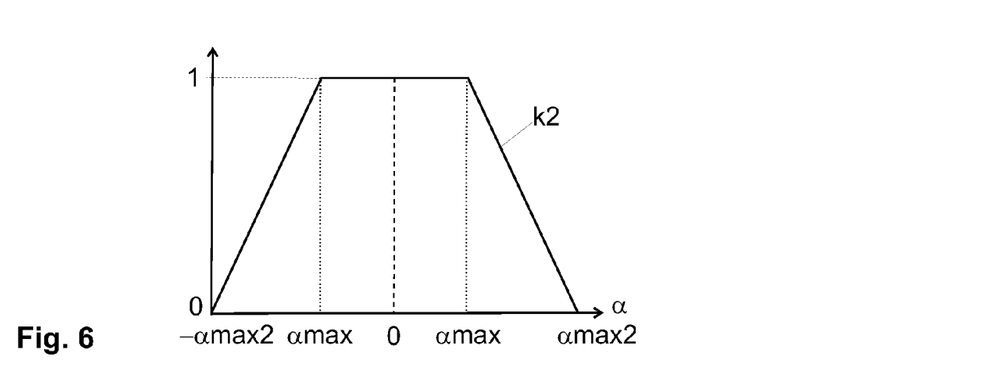
FIG. 6: shows a second scale factor k2 in relation to the steering wheel angle.

In FIGS. 4, 5 and 6 examples of functional relationships or look-up tables are shown as graphs.

The first look-up table 29 describes the relationship between the assistance limit TR0max for the requested motor torque 13 and the vehicle speed. At a vehicle speed below the maximum parking speed v1 the assistance function is very less limited. In the example at FIG. 4 are different vehicle speed range limits marked. The absolute value of the assistance limit TR0max is decreased by increasing the speed from zero to the maximum parking speed v1, to the maximum city speed v2, to the slow county road speed v3, to the maximum county road speed v4. It is clear that the vehicle speed v is a hint to the driving situation, but not enough to describe the driving situation in total. The actual driving situation can be misinterpreted by using the speed only.

To improve the adoption to the real driving situation, steering torque TA is also used, like the second look-up table 30 shown in FIG. 5. The first limiting factor k1 is one at a low absolute value of the steering torque TA. If the absolute value of the steering torque exceeds a threshold first maximum torque TAmax, the limiting factor k1 is decreased up to zero at the threshold second maximum steering torque TAmax2. The steering torque TA could represent par example the steering shaft torque 12. It could be also as an alternative that the intermediate correction driver support value 25 itself represents the steering torque TA.

To improve the adoption to the real driving situation, steering angle α is also used, like the third look-up table 31 shown in FIG. 6. The second limiting factor k2 is one at a low absolute value of the steering angle α. If the absolute value of the steering angle α exceeds a threshold first maximum angle αmax, the limiting factor k2 is decreased up to zero at the threshold second maximum steering angle αmax2. The steering angle α could represent par example the rotational steering shaft angle.

Further improvements for the adoption are possible. As an example, the rotational angular speed of the steering shaft or the acceleration of the vehicle speed could be used to determine further limiting factors ki.

The correction driver support value 26 is calculated as follows:

If the absolute value of the requested motor torque 13 is less than the assistance limit TR0max, the correction driver support value 26 is equal to the intermediate correction driver support value.

If the absolute value of the requested motor torque 13 is higher than or equal to the assistance limit TR0max, the correction driver support value 26 is equal to the intermediate correction driver support value 25 multiplied with the limiting factor k.

The limiting factor is equal to one of the first or the second limiting factor. Preferred the limiting factor k is equal to the multiplication of the first limiting factor k1 and the second limiting factor k2. If further limiting factors ki are used, the limiting factor k is preferably calculated as to the multiplication of all limiting factors k1, k2, ki.

What is claimed is:

1. A method of operating an electric power steering system, applicable for superimposing a driver demand and a driver assistance device demand value to calculate a driver requested support value, the method comprising:
    calculating a virtual driver support value on the basis of the driver demand;
    calculating a correction driver support value on the basis of a driver assistance device demand value;
    calculating the driver requested support value as a combination of the correction driver support value and the virtual driver support value; and
    controlling a motor of the electric power steering system using the driver requested support value, wherein calculating the correction driver support value includes:
    calculating an intermediate correction driver support value on basis of the driver assistance device demand value;
    comparing an absolute value of the intermediate correction driver support value with an assistance limit;
    if the absolute value of the intermediate correction driver support value exceeds the assistance limit, then multiplying the intermediate correction driver support value with a limiting factor to get the correction driver support value, wherein the limiting factor has a value, which is less than one and greater than or equal to zero, and
    if the absolute value of the intermediate correction driver support value is less than the assistance limit, then setting the correction driver support value as to the intermediate correction driver support value.

2. The method of operating an electric power steering system according claim 1, wherein the assistance limit depends on a vehicle speed.

3. The method of operating an electric power steering system according claim 1, wherein the limiting factor depends on a steering angle.

4. The method of operating an electric power steering system according to claim 1, wherein the limiting factor depends on a steering torque.

5. The method of operating an electric power steering system according to claim 1, wherein a relationship between the limiting factor and the one or more of a vehicle speed, a steering angle, or a steering torque is predetermined and calculated in a functional block or stored in a look-up table.

6. The method of operating an electric power steering system according to claim 1, wherein the driver demand is a steering shaft torque which is introduced into the steering shaft by the driver, wherein the virtual driver requested support value is a virtual requested motor torque, wherein the correction driver support value is a correction driver support torque, or any combination of the preceding.

7. A control device for an electric power steering system, applicable for controlling a requested motor torque supporting the driver effort during a steering operation by superimposing a driver demand and a driver assistance device demand value, the control device comprising:

a first controller portion configured to calculate a virtual driver support value;

a first assistance controller portion with an electric input for the driver assistance device demand value, wherein the first assistance controller portion is configured to calculate, an intermediate correction driver support value;

a limiting controller portion with an input for the intermediate correction driver support value from the first assistance controller portion, and with an input for one or more basic values, selected from the group consisting of vehicle speed, steering angle, steering torque wherein the limiting controller portion is configured to limit the intermediate correction driver support value by multiplying with a limiting factor which depends on the one or more basic values, and which is further configured to output the limited value as the correction driver support value, wherein the limiting controller portion comprises a first functional block, which is adapted to receive as an input signal the vehicle speed, a second functional block which is adapted to receive as an input signal the steering torque and a third functional block which is adapted to receive as an input signal the steering angle;

a memory block configured to store for storing an assistance limit, said assistance limit being the output of the first signal block; and an adder configured to calculate the requested motor torque as a sum of the correction driver support value and the virtual driver support value and to output said sum to one or more further devices of the electric power steering system to control a motor of the electric power steering system.

8. The control device according claim 7, wherein the control device further comprises a combination device configured to combine a first limiting factor output from said second functional block and a second limiting factor as output from said third functional block by multiplication to obtain the limiting factor, wherein the control device is configured to calculate said correction driver support value based on of said assistance limit, said limiting factor, and said intermediate correction driver support value.

9. The control device according to claim 7, wherein the first, second and third functional blocks are first, second and third look-up tables.

10. The control device according to claim 7, wherein the control device further comprises an observer configured to calculate one or more values to improve steering control based on at least vehicle speed and steering shaft torque and a mathematical model for a steering device.

* * * * *